(12) United States Patent
Kovács

(10) Patent No.: US 7,617,764 B2  
(45) Date of Patent: Nov. 17, 2009

(54) REMOTE CONTROLLABLE AUTOMATIC APPARATUS FOR PREPARING FRIED POTATO PRODUCT FROM DEHYDRATED POTATO

(76) Inventor: László Kovács, Normafa u. 51, H-1121 Budapest (HU)

( * ) Notice: Subject to any disclaimer, the term of this patent is extended or adjusted under 35 U.S.C. 154(b) by 31 days.

(21) Appl. No.: 10/498,908

(22) PCT Filed: Dec. 29, 2002

(86) PCT No.: PCT/HU01/00154

§ 371 (c)(1), (2), (4) Date: Oct. 8, 2004

(87) PCT Pub. No.: WO03/055368

PCT Pub. Date: Jul. 10, 2003

(65) Prior Publication Data

US 2005/0034608 A1  Feb. 17, 2005

(51) Int. Cl.  
*A47J 37/12*  (2006.01)

(52) U.S. Cl. ............... 99/330; 99/331; 99/333; 219/494; 219/497

(58) Field of Classification Search ........... 99/327–334, 99/357, 403–410; 221/9, 150 R, 150 A, 150 HC; 219/456, 492, 494, 497; 426/231–233, 438, 426/439, 506, 523; 700/236  
See application file for complete search history.

(56) References Cited

U.S. PATENT DOCUMENTS

| | | | | |
|---|---|---|---|---|
| 3,724,715 A | * | 4/1973 | Auriemma | 221/4 |
| 4,646,627 A | * | 3/1987 | Bartfield et al. | 99/330 |
| 4,694,742 A | * | 9/1987 | Dover | 99/404 |
| 4,722,267 A | * | 2/1988 | Galockin et al. | 99/357 |
| 4,766,548 A | | 8/1988 | Cedrone et al. | |
| 5,012,674 A | * | 5/1991 | Millheim et al. | 73/152.03 |
| 5,189,944 A | * | 3/1993 | Rasmussen et al. | 99/334 |
| 5,272,961 A | * | 12/1993 | Campbell et al. | 99/353 |
| 5,352,866 A | * | 10/1994 | Cartwright et al. | 219/497 |
| 5,398,668 A | * | 3/1995 | Daneshvar et al. | 126/374.1 |
| 5,404,796 A | * | 4/1995 | Campbell et al. | 99/357 |
| 5,575,194 A | * | 11/1996 | Maher et al. | 99/330 |
| 5,586,486 A | * | 12/1996 | Nitschke et al. | 99/330 |

(Continued)

FOREIGN PATENT DOCUMENTS

EP  0 285 056  10/1988

(Continued)

OTHER PUBLICATIONS

English Abstract of WO 00/48467 dated Aug. 24, 2000.

*Primary Examiner*—Timothy F. Simone  
(74) *Attorney, Agent, or Firm*—Ladas & Parry LLP

(57) ABSTRACT

A remote controllable automatic apparatus for preparing fried potato product from dehydrated potato, frying the potato product prepared with addition of at least water in subsequent operational cycles. The apparatus comprising a frying unit with a frying oil container and electric means for heating the frying oil; and also including electronic sensors (2) for measuring and storage devices for registering selected parameters of the frying process. Further comprises a status register (3) for storing status data and frying parameters relating to actual and former operational cycles, and also enabling data; and an interface (4) connected to a telecommunication network (7) for on-line transmitting and for on-line modifying the status register (3) content.

20 Claims, 1 Drawing Sheet

U.S. PATENT DOCUMENTS

Figure 1:
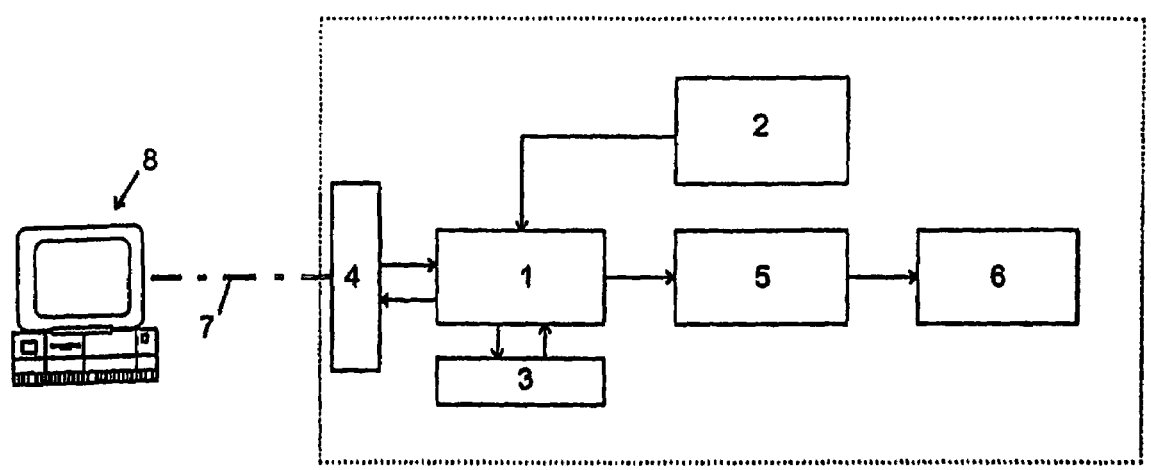

| | | | | |
|---|---|---|---|---|
| 5,605,091 | A * | 2/1997 | Garber | 99/330 |
| 5,759,601 | A | 6/1998 | Kovacs | |
| 5,974,951 | A | 11/1999 | Kovacs | |
| 6,552,309 | B1 * | 4/2003 | Kish et al. | 219/506 |
| 6,958,166 | B2 | 10/2005 | Taylor | |

FOREIGN PATENT DOCUMENTS

| | | |
|---|---|---|
| WO | 95/13007 | 5/1995 |
| WO | 99/43068 | 8/1999 |
| WO | 00/48467 | 8/2000 |
| WO | 03/026437 A2 | 3/2003 |

* cited by examiner

REMOTE CONTROLLABLE AUTOMATIC APPARATUS FOR PREPARING FRIED POTATO PRODUCT FROM DEHYDRATED POTATO

The invention is relating to a remote controllable automatic apparatus for preparing fried potato product from dehydrated potato, frying the potato product prepared with addition of at least water in subsequent operational cycles, the apparatus comprising a frying unit with a frying oil container and electric means for heating the frying oil; and also including electronic sensors for measuring and storage devices for registering selected parameters of the frying process.

Such automatic apparatus and process for preparing fried potato product from dehydrated potato are known from U.S. Pat. No. 5,974,951 and U.S. Pat. No. 5,759,601 which were filed by the same inventor as now. These improved solutions made possible to prepare potato products of the above mentioned kind, which products fried on the spot and very similar in its look and flavour to that of which made of non dehydrated potato, called French fried potato. The said patent specifications disclose an improved dough making unit adapted to dehydrated potato granulate, and an integral frying principle, where the introduced heat energy during frying is set to constant independently from the small variation of the outside conditions. Generally the most critical variation is that of the main power voltage, and upper limitation of this main power voltage within the apparatus is suggested in Hungarian patent application HU P9900555.

The specification of U.S. Pat. No. 4,766,548 shows a microprocessor controlled system for monitoring, storing and periodically reporting on data pertinent to the commercial operation of a reporting system, such as a soft drink vending machine, to a central data collection and monitoring computer, and which periodically reports such data over a telephone line which it accesses on a nondedicated basis. The microprocessor controls operations of the telelink system, and stores in memory data related to the overall status of the commercial operation of the reporting system, such as totals, inventory, etc.

The most significant difference between usual vending machines and the subject potato frying machines that this latter carry out gastrotechnical processes on the spot, under varying environmental conditions, and these conditions may take influence on the final product quality. This involved the problem of controlling and testing the technological features of an apparatus according to the introducing paragraph. It has been recognised that this can be handled by specific remote operation control system of a quite simple architecture, which furthermore makes possible occasional functional tests and to disable the apparatus from a remote computer.

The present invention therefore provides an automatic apparatus according to the introducing paragraph, which comprises a status register for storing status data and frying parameters relating to actual and former operational cycles, and also enabling data; and an interface connected to a telecommunication network for on-line transmitting and for on-line modifying the status register content.

The invention will be further described with the help of the enclosed drawing, in which FIG. 1 is showing the functional block diagram of a typical embodiment of the remote controllable automatic apparatus according to the present invention.

The invented remote controllable apparatus for preparing fried potato product from dehydrated potato granulate is illustrated in FIG. 1. The functional blocks indicated by references 1 to 6 are within the automatic apparatus, as the dotted line rectangle shows. A processor 1, for example a computer unit, serves as a main controller for the functional units. The processor 1 receives the electronic output signals of electronic sensors 2 for measuring certain selected frying parameters of the frying process, such as the temperature of the frying oil, which can be measured by a multi-point arrangement of temperature sensors, which arrangement provides values measured at different locations of the frying oil container, for example at a lower level location and at a higher level location. The temperature of the frying oil without steering may be different by levels or by locations. Furthermore the block of sensors 2 comprises level indicators, which shows when the frying oil level in the frying oil container becomes insufficient, and also serves for metering the granulate and the water volume in the granulate and water containers respectively. Some position sensors may be used for the moving mechanical elements of the automatic apparatus. These elements can be known from U.S. Pat. No. 5,974,951 which patent specification is cited herewith as a reference. The electronic sensors 2 may comprise as well suitable means for measuring flow of water necessary for making dough from the granulated potato and flow of the frying oil refilled.

The block of drives 5 comprises drives, especially power drives for elements of the next block of actuating mechanisms 6 which comprises servo motors, magnetic valves and other similar elements, referring to U.S. Pat. No. 5,974,951 again. These drives 5 and indirectly the actuating mechanisms 6 are controlled by the processor 1 in response to the signals of sensors 2 and the control commands coming from outside, through the interface 4. The processor 1 is in a bidirectional connection with a status register 3, which is for storing status data and frying parameters relating to actual and former operational cycles of the apparatus, and also for storing enabling data. This latter serves for remotely enabling the automatic apparatus itself, as it will be described later.

An interface 4 is connected to the processor 1 and to an outside telecommunication network 7 for on-line transmitting and for on-line modifying the content of the status register 3. The status register 3 is a storage devices for registering certain frying parameters and status data. The telecommunication network can be basically a public telephone network, through a public or a private rented circuit. The interface 4 can be a known and commonly used modem. The data transmission speed is not critical in this case.

At a remote terminal point of the telecommunication network 7 a computer 8 is reserved for controlling on-line transactions such as checking, testing, and enabling the apparatus.

The status register 3 contains information about the actual and past status of the remote controllable automatic apparatus. Some areas of the status register 3,constitute a subregister which can be reset, while other areas, an other subregister can not be reset. This means that a subregister is provided for counting the number of operating cycles from the last reset, executed for example by a push button on the apparatus being accessible by the operating personnel. An other subregister is provided for counting the total number of operational cycles, and also the passed time from initial turning on. This subregister can not be reset. This is useful for tracing the working chronology of a given apparatus. The current operational mode is also among the status data, so it can be transmitted on request through the telecommunication network 7 to the remotely located computer 8. The current operational mode can be active operation, stand-by, test or disabled. In active operation mode preparing an ordered product is under processing, i.e. at least one individual order is under service or in other words an operating cycle is on. In stand-by mode the apparatus is capable to accept an order, while in test mode only instructions from the telecommunication network 7 can be responded. The disabled mode will be described later.

In a preferred embodiment, as it has been described by the same applicant in U.S. Pat. No. 5,759,601, the automatic apparatus comprises means for controlling the dwelling time of a portion of rehydrated potato product in the frying oil as frying time in each cycle; means for computing the introduced energy amount by integrating the temperature of frying oil over the frying time; means for determining the termination of frying time on the term that said introduced energy amount equals to a predetermined constant value. For this case the frying parameters in the status register 3 comprise the main power supply input voltage and/or the heating power introduced to the frying oil.

An other important point of the present invention the possibility to remotely switch from stand-by mode to test mode, through the telecommunication network 7 and the interface 4. In test mode the functional units, i.e. drives 5 and actuating mechanisms 6, can be remotely activated one by one, and flags are generated in the status register if proper operation of the respective functional units found. This test mode can be managed by bidirectional transmission for instructions for a single functional operation and checking the generated flag in the status register 3. If such flag is not generated by the processor 1 in a certain test step, maintenance personnel may be alerted in order to repair the apparatus or avoid the malfunction.

In a preferred embodiment the authorised person can use a personal computer 8 at remote location to carry out the test mode functions, where the progress of a mechanical operations appear in simplified animated drawings in motion. This means, for example, that the rotating plate of the dough making unit or the baskets of the frying unit (see U.S. Pat. No. 5,974,951) can be traced along their motion on the monitor screen of the computer 8.

Further very important feature of the present invention that it makes possible to remotely switch off the apparatus, i.e. the active operation mode can be remotely on-line disabled through the interface 4. This disabled mode can be withdrawn only by privileged user, by an other on-line instruction for the remote apparatus. The importance of this feature lies in that the granulate for the automatic apparatus often has to be supplied only by a licenced distributor or dealer. After a certain operational cycles the supplied granulate must run out. Until the owner or renter of the apparatus does not buy a further volume of base granulate, the active operation mode can be remotely suspended. At the same time this disabled mode can be switched back to stand-by mode, or can be enabled for a limited number of operational cycles. This can be carried out remotely, on-line, through the telecommunication network 7 and the interface 4.

The invention claimed is:

1. A remote controllable automatic frying apparatus for preparing fried potato product from dehydrated potato stored in the apparatus, and frying the potato product with addition of at least water in subsequent operational cycles, the apparatus comprising:
   a frying unit with a frying oil container for the preparing of the fried potato product;
   electrical means for electrically heating the frying oil;
   electronic sensors for measuring certain selected frying parameters;
   storage devices, and
   an interface connected to a telecommunications network,
   wherein the storage devices comprise a status register for storing the status data and the frying parameters relating to actual and former operational cycles of the apparatus, and also for storing enabling data,
   wherein the status data comprise at least a number of operational cycles from a last reset, a total number of operational cycles, passed time from initial turning on, and a current operational mode, and
   wherein the status register content is transmitted via the telecommunications network and modified on-line.

2. The apparatus according to claim 1 wherein the frying parameters comprise at least multi-point temperature values measured at different locations of the frying oil container.

3. The apparatus according to claim 2, wherein an active operation mode can be remotely on-line disabled through the interface, which disabled mode can be withdrawn by privileged user on-line.

4. The apparatus according to claim 3, wherein a stand-by mode can be remotely on-line enabled for a limited number of operational cycles, through the interface.

5. The apparatus according to claim 2, wherein a stand-by mode can be remotely on-line enabled for a limited number of operational cycles, through the interface.

6. The apparatus according to claim 1, wherein the number of operational cycles being stored in two separate subregister, where the first subregister cannot be reset and counts the total number of operational cycles from the first use, and the second subregister can be reset to zero and counting the number of operational cycles from the last reset.

7. The apparatus according to claim 6, wherein an active operation mode can be remotely on-line disabled through the interface, which disabled mode can be withdrawn by privileged user on-line.

8. The apparatus according to claim 7, wherein a stand-by mode can be remotely on-line enabled for a limited number of operational cycles, through the interface.

9. The apparatus according to claim 6, wherein a stand-by mode can be remotely on-line enabled for a limited number of operational cycles, through the interface.

10. The apparatus according to claim 1, further comprising:
    means for controlling the dwelling time of a portion of dehydrated potato product in the frying oil as a frying time in each cycle;
    means for computing the introduced energy amount by integrating the temperature of frying oil over the frying time; and
    means for determining the termination of frying time on the term that said introduced energy amount equals to a predetermined constant value;
    wherein the frying parameters in the status register comprise at least one of a power supply input voltage and a heating power to the frying oil.

11. The apparatus according to claim 10, wherein the apparatus can be remotely switched through the interface from stand-by mode to a test mode, in which functional units can be remotely activated one by one, and flags in the status register are generated by proper operation of the relevant functional units.

12. The apparatus according to claim 11, wherein a stand-by mode can be remotely on-line enabled for a limited number of operational cycles, through the interface.

13. The apparatus according to claim 11, wherein an active operation mode can be remotely on-line disabled through the interface, which disabled mode can be withdrawn by privileged user on-line.

14. The apparatus according to claim 13, wherein a stand-by mode can be remotely on-line enabled for a limited number of operational cycles, through the interface.

15. The apparatus according to claim 10, wherein an active operation mode can be remotely on-line disabled through the interface, which disabled mode can be withdrawn by privileged user on-line.

16. The apparatus according to claim 15, wherein a stand-by mode can be remotely on-line enabled for a limited number of operational cycles, through the interface.

17. The apparatus according to claim 10, wherein a stand-by mode can be remotely on-line enabled for a limited number of operational cycles, through the interface.

18. The apparatus according to claim 1, wherein an active operation mode can be remotely on-line disabled through the interface, which disabled mode can be withdrawn by privileged user on-line.

19. The apparatus according to claim 18, wherein a stand-by mode can be remotely on-line enabled for a limited number of operational cycles, through the interface.

20. The apparatus according to claim 1, wherein a stand-by mode can be remotely on-line enabled for a limited number of operational cycles, through the interface.

* * * * *